Patented May 18, 1926.

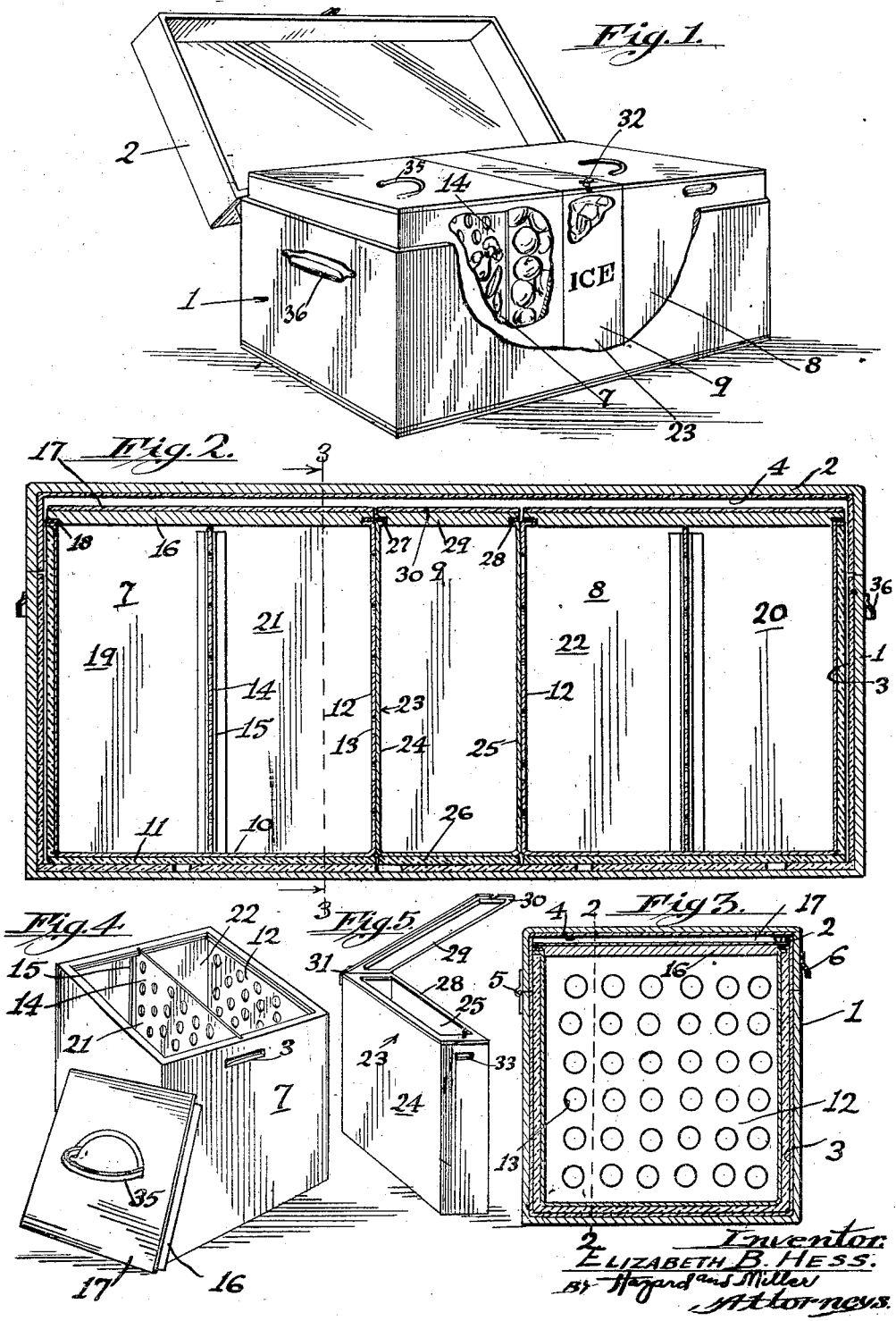

1,585,032

UNITED STATES PATENT OFFICE.

ELIZABETH B. HESS, OF NACHES, WASHINGTON.

ICE TRUNK.

Application filed May 29, 1924. Serial No. 716,716.

This invention relates to an ice trunk and consists of the novel features herein shown, described and claimed.

The leading object of this invention is to provide a refrigerator trunk for use in the fruit department of the news and vending service of passenger trains so that fruit may be served ice cold to the passengers on a train, though the use of the ice trunk is not limited thereto and may be for household use, on motor vehicles and the like.

Another object is to make a thermally insulated trunk especially adapted to carry fruit and other perishable food and provide a suitable ice box adapted to be in close contact with the food compartments.

Another object is to make a refrigerator trunk having end compartments for carrying fresh fruit and other perishable and an intermediate compartment for carrying ice or brine, the fruit compartments and ice box having adjacent thermally conducting walls, and the bottom, top and all other walls being principally of thermal insulating material.

Another object is to make a trunk adapted to carry fruit and referigerating material for cooling the fruit.

Other objects and advantages will appear from the drawings and specification.

The drawings illustrate the construction and operation of an ice trunk embodying the principles of my invention.

Figure 1 is a perspective of the ice trunk as in use, parts being broken away and shown in section, and the lid being in open position.

Figure 2 is a vertical longitudinal detail of the closed trunk, the view being taken as on the line 2—2 of Fig. 3.

Fig. 3 is a vertical cross section on the line 3—3 of Fig. 2.

Fig. 4 is a perspective of one of the fruit compartment boxes and showing the cover removed.

Fig. 5 is a perspective of the ice compartment box.

The details of construction and operation shown in the drawings are as follows:

The body of the trunk comprises a rectangular box having an outer frame work 1 of good fiber material and the trunk lid 2 of the same material. The body 1 has a substantial lining 3 of thermal insulating material, and the lid 2 has a lining 4 of material similar to the lining 3. The lid 2 is connected to the body 1 by hinges 5, and has a lift 6 at the opposite side from the hinges 5. The fruit compartments 7 and 8 are formed in boxes adapted to fit closely in the opposite ends of the body 1 and the ice box compartment 9 is a box adapted to fit between the boxes forming the compartments 7 and 8. The body of the fruit box 7 consists of an aluminum frame 10 forming the lining and an outside material 11 covering the aluminum 10 on three vertical sides and on the bottom, said material being a good thermal insulation. The uninsulated side 12 of the aluminum frame 10 is foraminous, that is, it has a large number of perforations 13 so as to increase the thermal conductivity of cold. The foraminous aluminum partition 14 is removably mounted in slideways 15 so as to divide the compartment 7 into two parts.

The cover consists of a heavy piece of fiber material 16 and a piece 17 of thermal insulating material. The piece 16 is rabbeted and has a packing face 18 upon the rabbet all the way around to make a close joint with the aluminum frame 10.

The construction of the compartment 8 is identical with the construction of the compartment 7. The partitions 14 are simply intended to keep the fruit stacked up against the sides 12 as long as possible, and this is accomplished by selling the fruit out of the chambers 19 and 20 first, these chambers being at the opposite sides of the partitions from the chambers 21 and 22 and the farthest away from the ice box.

The ice box compartment 9 is formed by a rectangular box 23 of aluminum and having the sides 24 and 25 bare and adapted to contact directly with the sides 12 of the compartments 7 and 8. A piece 26 of thermal insulating material is applied to the bottom and ends of the aluminum box 23. An inturned flange 27 is formed all the way around the top of the box. A packing or gasket 28 fits upon the flange 27. A cover board 29 of fiber is rabbeted all the way around the rabbet fitting upon the gasket 27 and the gasket 27 may be carried by the rabbet or by the flange. A piece 30 of thermal insulation is applied to the top of the board 29. The cover comprising the board 29 and insulation 30 is hinged at its back end 31 to the box and a thumb screw construction 32 at the front end provides means for holding the cover tight to pinch the gasket 27 so that water will not slop out of the compartment.

Hand holds 33 are provided at the ends of the ice box for lifting the box. Similar hand holds 34 are provided for lifting the compartment boxes 7 and 8. Disappearing handles 35 are provided for lifting the covers of the compartment boxes. Hand holds 36 are provided for lifting the trunk.

The only metal in the ice trunk thus constructed is the thin sheets of aluminum forming the frames of the compartments 7, 8 and 9. The bulk of the trunk, including the fiber boards, is well calculated for thermal insulation, and at the same time the trunk without the load is comparatively light.

In the practical operation, the fruit may be kept in a cold storage place either in bulk or in the compartments 7 and 8 and the trunks either filled or emptied may be thoroughly pre-cooled so that when the cold fruit is placed in the cold trunk and the ice box filled and the trunk closed, there is very little chance for heat to get in contact with the fruit, and the fruit is already cold, and the ice, the ice water, or cracked ice and water making brine, is well calculated to keep the fruit in a cold condition while it is being vended upon a passenger train. Whenever desired, the ice box may be removed and emptied of the water, brine and the like.

Thus I have produced a trunk adapted to carry fruit, adapted to be pre-cooled, and adapted for carrying material for cooling the fruit, the trunk comprising a body of thermal insulating material, boxes fitting in the trunk for carrying fruit and composed of thermal insulating material, and an ice box fitting in the trunk in contact with the fruit boxes and composed of thermal conducting material.

While the trunk described is primarily intended for refrigerating fruit sold on trains, it will be understood it may be used in the home for keeping perishable food, or on motor vehicles and wherever it is desired to keep perishable food, in an easily portable light container, in which both the food and the ice are in sealed compartments.

While I prefer to have the trunk provided with thermal insulating material, it will be understood that my invention is also applicable to trunks which are not so provided. The results, however, are best when the trunk is thermally insulated.

Various changes may be made without departing from the spirit of the invention as claimed.

I claim:

1. A trunk having a body composed of thermo-insulating material, fruit boxes fitting in the trunk comprising metal frames covered with thermo-insulating material except at their inner sides, the fruit boxes being readily removable with their insulating covering, and a removable ice box fitting in the trunk between the fruit boxes and having thermo-conducting material in contact with the bare metal inner sides of the fruit boxes, said bare metal sides being foraminous.

2. A trunk having a body composed of thermo-insulating material, a fruit box at each end of the trunk, said fruit boxes being formed of aluminum frames with outwardly extending flanges on the top and insulating material secured to the bottom and the three sides thereof in contact with the walls of the trunk, said insulating material being attached to the boxes whereby the boxes with their insulating material may be removed as a unit and an ice box formed of thermo-conducting material placed between the fruit boxes and having insulating material attached to the base thereof, the thermo-conducting material of the fruit boxes and the ice box being in contact.

In testimony whereof I have signed my name to this specification.

ELIZABETH B. HESS.